United States Patent [19]

Cobb et al.

[11] Patent Number: 4,842,230
[45] Date of Patent: Jun. 27, 1989

[54] FASTENER MEANS FOR SECURING WALL GRIDS TO A SUPPORT SURFACE

[75] Inventors: Dean L. Cobb, Hoffman Estates; Edward M. Bleser, Elgin, both of Ill.

[73] Assignee: Grayline Housewares, Elgin, Ill.

[21] Appl. No.: 153,720

[22] Filed: Feb. 1, 1988

[51] Int. Cl.⁴ ............................................. A47B 96/06
[52] U.S. Cl. ................................. 248/225.2; 211/106; 211/181; 248/302; 248/304
[58] Field of Search ............... 248/225.2, 302, 304, 248/220.2, 301, 210, 211, 238; 182/121; 211/181, 106, 87

[56] References Cited

U.S. PATENT DOCUMENTS

| | | | |
|---|---|---|---|
| 887,578 | 5/1908 | Beyer | 248/58 |
| 1,341,827 | 6/1920 | Varicle | 211/106 X |
| 3,759,474 | 9/1973 | Narkie | 248/238 |
| 4,004,526 | 1/1977 | King | 211/106 X |
| 4,234,094 | 11/1980 | Jorgensen | 248/220.2 X |
| 4,340,144 | 7/1982 | Cousins | 211/106 X |
| 4,591,058 | 5/1986 | Amstutz et al. | 211/87 X |

FOREIGN PATENT DOCUMENTS

| | | | |
|---|---|---|---|
| 1478879 | 3/1967 | France | 211/106 |
| 1230856 | 5/1971 | United Kingdom | 211/106 |

Primary Examiner—Alvin C. Chin-Shue
Assistant Examiner—David L. Talbott
Attorney, Agent, or Firm—Robert E. Knechtel; Basil E. Demeur

[57] ABSTRACT

A two-piece fastener means comprising a grid bracket and a concealment member having a hook for use in securing a wall grid to a support surface. In securing the wall grid to a support surface, one or more of the grid brackets are used. These grid brackets are generally U-shaped and are proportioned in size to extend into and through a grid opening formed by two horizontal and two vertical wires. The arms of the grid brackets are formed to lockingly engage with the two adjacent spaced-apart vertical wires. After securing the wall grid to the support surface, a concealment member is releasably secured to the upper one of the two horizontal wires between which the grid bracket extends and extends downwardly between the two arms of the grid bracket. In this fashion, the concealment member conceals the manner in which the grid brackets and, hence, the wall grid is secured to the support surface.

10 Claims, 2 Drawing Sheets

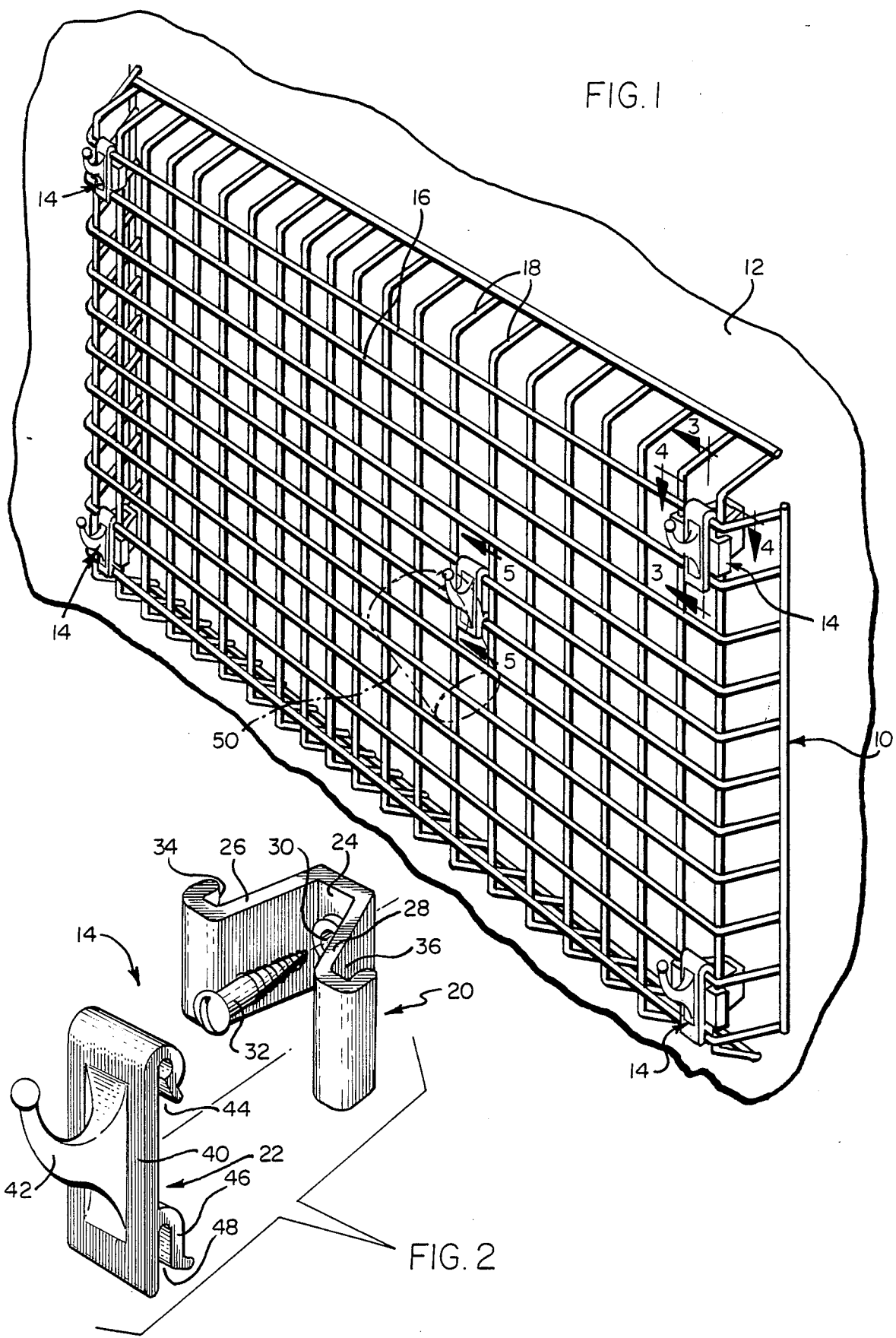

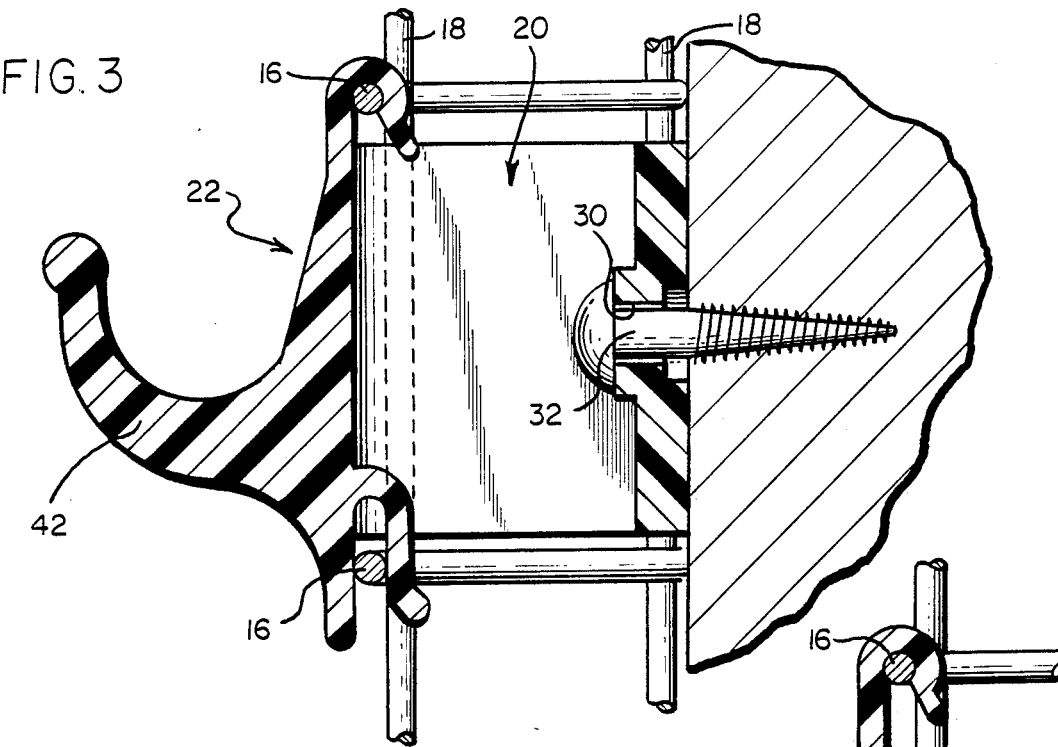
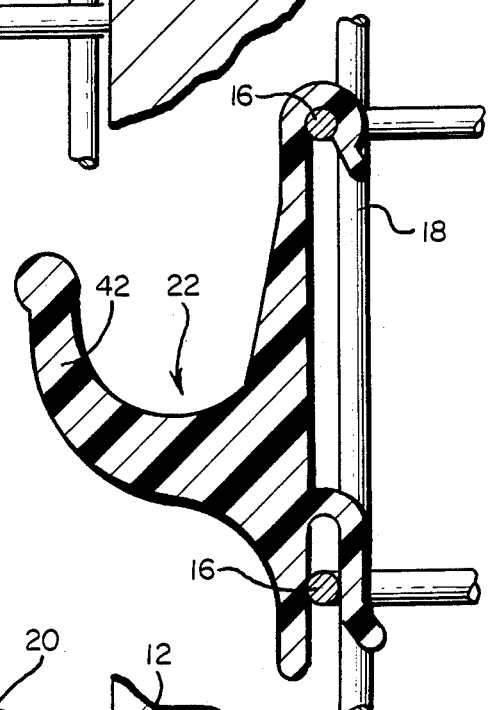
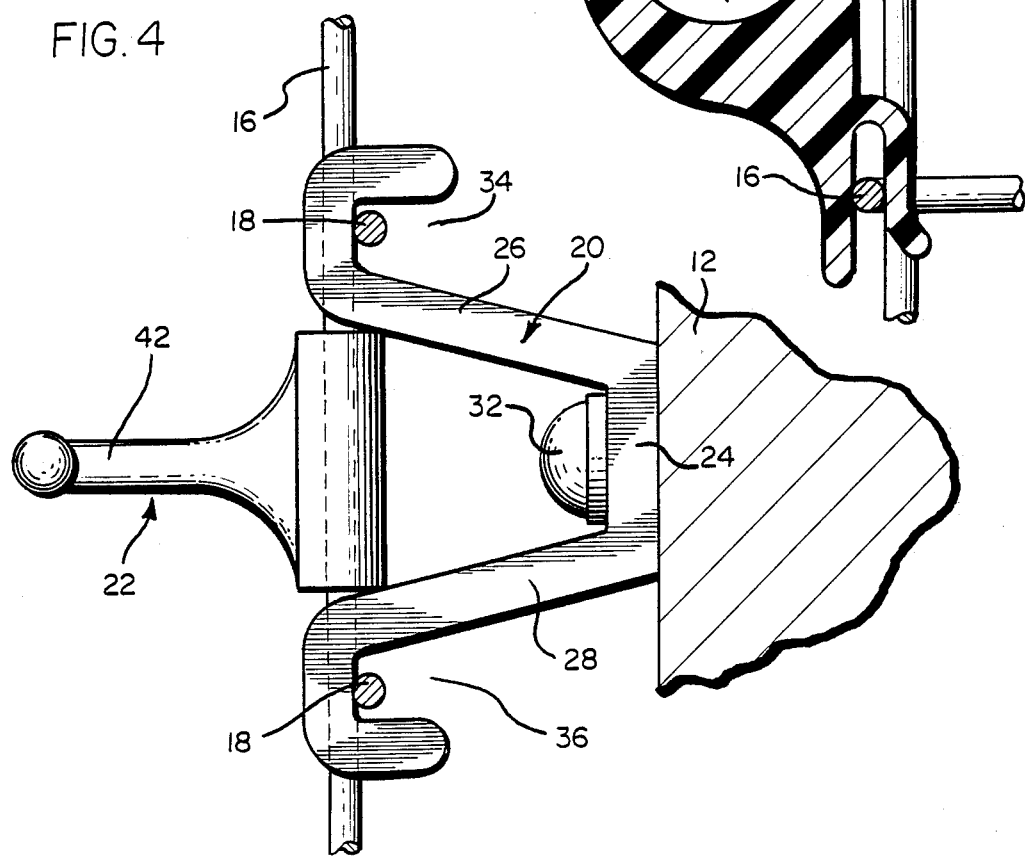

FASTENER MEANS FOR SECURING WALL GRIDS TO A SUPPORT SURFACE

This invention relates to an improved fastener means for securing wall grids to a wall or other flat support surfaces.

Wall grids, i.e., grids which genreally are formed of horizontal and vertical extending wires that are secured together to form a grid are generally well-known in the art. In the past, these wall grids have been fastened to a wall or other support surface using brackets on the outer wires. These brackets are clearly visible and unattractive.

Accordingly, it is an object of the present invention to provide an improved fastener means for securing wall grids to a support surface.

In accordance with the invention, a two-piece fastener means comprising a grid bracket and a concealment member having a hook on it are used to secure the wall grid to a support surface. In securing the wall grid to a support surface, one or more of the grid brackets are used. These grid brackets are generally U-shaped and are proportioned in size to extend into and through a grid opening formed by two horizontal and two vertical wires. The arms of the grid brackets are formed to lockingly engage with the two adjacent spaced-apart vertical wires. After securing the wall grid to the support surface, a concealment member is releasably secured to the upper one of the two horizontal wires between which the grid bracket extends and extends downwardly between the two arms of the grid bracket. In this fashion, the concealment member conceals the manner in which the grid brackets and, hence, the wall grid is secured to the support surface. Additional ones of the concealment members can be affixed to the wall grid to provide means for hanging objects such as coffee cups and the like on the wall grid. Since the concealment members are the same as those used to conceal the manner in which the grid brackets secure the wall grid to a support surface, it is not readily evident that those concealment members serve the dual purpose of concealing the grid brackets and means for hanging objects on the wall grid.

Other objects, advantages and features not specifically mentioned will become apparent from the description below when considered in conjunction with the drawings.

DESCRIPTION OF THE DRAWINGS

FIG. 1 is a perspective view generally illustraing the manner in which a wall grid is secured to a support surface with the fastener means of the invention;

FIG. 2 is an exploded perspective view of the two-piece fastener means of the invention;

FIG. 3 is a sectional view taken along lines 3—3 of FIG. 1;

FIG. 4 is a sectional view taken along lines 4—4 of FIG. 1; and

FIG. 5 is a sectional view taken along lines 5—5 of FIG. 1.

DESCRIPTION OF A PREFERRED EMBODIMENT

Referring now to the drawings, in FIG. 1 there is illustrated a wall grid 10 secured to a wall or support surface 12 by means of a number of fastener means 14 (four as illustrated). The wall grid 10 is formed of a number of horizontal wires 16 and vertical wires 18 which are affixed together in spaced-apart relationship to form a grid. These wires 16 and 18 are bent at their ends to effectively form side walls which function to space the grid per se from the support surface or wall 12. The wires 16 and 18 also preferably are coated with a plastic or vinyl material.

As indicated above, in the past, these wall grids 10 have been fastened to a wall or other support surface using brackets on the outer wires. The brackets were clearly visible and unattractive. These brackets are replaced by the fastener means 14 of the invention, which include a grid bracket 20 and a concealment member 22. As can be best seen in FIGS. 2-5, the grid bracket 20 is generally U-shaped having a back portion 24 and a pair of arms 26 and 28. The back portion 24 is a flat surface and it has formed in it an aperture 30 for receiving therethrough a threaded screw 32 or the like for securing the grid bracket 20 to a wall or support surface 12. The ends of the arms 26 and 28 are reversely bent so as to form wire receiving slots 34 and 36 on them for receiving therein the vertically disposed wires 18. The grid bracket 20 is proportioned to be received through the opening formed by two horizontal and two vertical wires 16 and 18 and such that the two vertical wires 18 defining the opening are received within the respective ones of the wire receiving slots 34 and 36, as illustrated in FIGS. 3 and 4. The grid bracket 20 then is secured by extending the threaded screw 32 through the aperture 30 in the back portion 24 into the wall or support surface 12. The wire grid 10 is secured to the wall or support surface 12 by using one or more of these grid brackets 20, as illustrated in FIG. 1, wherein it can be seen that four of the grid brackets 20 are used.

The concealment member 22 includes a backing plate 40 to which is affixed to the front side thereof a hook 42. The upper edge of the backing plate 40 is reversely folded over toward the back side of the backing plate 42 so as to form a wire receiving slot 44 for receiving therein a horizontal wire 16. Also, preferably and advantageously, a generally L-shaped arm 46 is affixed to the back side of the backing plate 40 and is disposed so as to form a wire receiving slot 48 for receiving therein a horizontal wire 16. As can be seen in FIGS. 3 and 5, the two wire receiving slots 44 and 48 are disposed such that one horizontal wire 16 can be engaged within the wire receiving slot 48, the concealment member 22 raised so that the wire receiving slot 44 can be engaged with the horizontal wire 18 above the first mentioned wire, and the concealment member 22 then lowered to releasably secure the concealment member 22 to the two horizontal wires 18. In this fashion, the concealment member 22 can be secured to the wire grid 10 in front of the grid bracket 20 such as to conceal the manner in which the wire grid 10 is secured by the grid brackets 20 to the wall or support surface 12. It may also be noted that the back plate 40 of the concealment member 22 is proportioned to be received between the two arms 26, 28 of the grid bracket 20.

Accordingly, once the wall grid 10 is secured to a wall or support surface 12 using the grid brackets 20, the concealment members 22 can be affixed to the wall grid 10 to effectively conceal the manner in which the wall grid 10 is secured by means of the grid brackets 20 to the wall or support surface 12. The concealment members 22 each have thereon a hook 42 which can be used to hang objects such as the coffee cup 50 illustrated in phantom on the wall grid 10. Also, additional ones of the concealment members 22 can be affixed to the wall grid 10, as described, and used to hang objects on the wall grid 10. These additional concealment members 22 therefore further function to distract from and conceal the manner in which the wall grid 10 is secured using the grid brackets 20.

The concealment members 22 are illustrated having an L-shaped arm 46 affixed to the backing plate 40 thereof so as to provide a double locking of the concealment member 22 to the wire grid 10. While this arrangement is preferred, it is obvious that the concealment member 22 can be removably secured to the wire grid 10 by means of the wire receiving slot 44. These and other modifications can be made without departing from the spirit and scope of the invention.

What is claimed is:

1. In combination, a wall grid formed of a plurality of horizontal and vertical wires affixed together in spaced-apart relationship forming a grid and a fastener means securing said wall grid to a support surface, said fastener means comprising a generally U-shaped grid bracket having a pair of arms, the ends of said arms each having on the ends thereof a wire receiving slot receiving therein one of said wires of said wire grid, said grid bracket being received within the open space defined by two of said horizontal wires and two of said vertical wires with one of said two vertical wires each disposed within the respective ones of said wire receiving slots on the ends of said pair of arms, means securing said grid bracket to a support surface while disposed within said open space thereby securing said wall grid to said support surface, a concealment member comprising a backing plate having a hook member on a front face thereof, said backing plate having thereon on the back face thereof adjacent its upper edge a first wire receiving slot, said concealment member extending between said pair of arms of said grid bracket, said concealment member being releasably affixed to said wire grid to conceal the manner in which said grid bracket is used to secure said wall grid to said support surface by engaging the upper one of said pair of horizontal wires defining the open space in which said grid bracket is disposed within said first wire receiving slot on said backing plate and with said concealment member disposed between said pair of arms of said grid bracket.

2. The combination of claim 1, wherein said wire receiving slots on the ends of said arms of said grid bracket are formed by reversely folding the ends of each of said arms.

3. The combination of claim 1, further comprising a second wire receiving slot on the back face of said backing plate in spaced relationship to said first wire receiving slot receiving therein one of said wires forming said grid, the upper one of said horizontal wires defining the open space in which said grid bracket is disposed being engaged within said first wire receiving slot and the lower one of said horizontal wires defining the open space in which said grid bracket is disposed being engaged within said second wire receiving slot.

4. The combination of claim 1, wherein said first wire receiving slot on said backing plate is formed by reversely folding the upper edge thereof.

5. The combination of claim 1 wherein said second wire receiving slot on said backing plate is formed by an L-shaped member affixed to the back face of said backing plate.

6. In a wall grid formed of a plurality of horizontal and vertical wires affixed together in spaced-apart relationship forming a grid and a fastener means securing said wall grid to a support surface, the improvement comprising a fastener means comprising a generally U-shaped grid bracket having a pair of arms, the ends of said arms each having on the ends thereof a wire receiving slot receiving therein one of said wires of said wire grid, said grid bracket being received within the open space defined by two of said horizontal wires and two of said vertical wires with one of said two vertical wires each disposed within the respective ones of said wire receiving slots on the ends of said pair of arms, means securing said grid bracket to a support surface while disposed within said open space thereby securing said wall grid to said support surface, a concealment member comprising a backing plate having a hook member on a front face thereof, said backing plate having thereon on the back face thereof adjacent its upper edge a first wire receiving slot, said concealment member extending between said pair of arms of said grid bracket, said concealment member being releasably affixed to said wire grid to conceal the manner in which said grid bracket is used to secure said wall grid to said support surface by engaging the upper one of said pair of horizontal wires defining the open space in which said grid bracket is disposed within said first wire receiving slot on said backing plate and with said concealment member disposed between said pair of arms of said grid bracket.

7. The fastener means of claim 6, wherein said wire receiving slots on the ends of said arms of said grid bracket are formed by reversely folding the ends of each of said arms.

8. The fastener means of claim 6, further comprising a second wire receiving slot on the back face of said backing plate in spaced relationship to said first wire receiving slot receiving therein one of said wires forming said grid, the upper one of said horizontal wires defining the open space in which said grid bracket is disposed being engaged within said first wire receiving slot and the lower one of said horizontal wires defining the open space in which said grid bracket is disposed being engaged within said second wire receiving slot.

9. The fastener means of claim 6, wherein said first wire receiving slot on said backing plate is formed by reversely folding the upper edge thereof.

10. The fastener means of claim 6 wherein said second wire receiving slot on said backing plate is formed by an L-shaped member affixed to the back face of said backing plate.

* * * * *